(12) United States Patent
Rivière et al.

(10) Patent No.: US 10,050,679 B2
(45) Date of Patent: Aug. 14, 2018

(54) MULTI-MODE TRANSCEIVER ARRANGEMENT

(71) Applicant: NXP B.V., Eindhoven (NL)

(72) Inventors: Fabian Rivière, Cagny (FR); Jerome Brillant, Saint Germain la Blanche Herbe (FR); Sebastien Robert, Emieville (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/426,396

(22) Filed: Feb. 7, 2017

(65) Prior Publication Data
US 2017/0250737 A1 Aug. 31, 2017

(30) Foreign Application Priority Data
Feb. 26, 2016 (EP) .................................. 16290044

(51) Int. Cl.
*H04L 27/00* (2006.01)
*H04B 1/38* (2015.01)
(Continued)

(52) U.S. Cl.
CPC ............. *H04B 7/028* (2013.01); *H04W 4/005* (2013.01); *H04W 4/70* (2018.02)

(58) Field of Classification Search
USPC ....... 375/219, 220, 221, 222, 130, 136, 135, 375/147, 146, 148, 150, 152, 240, 240.26,
(Continued)

(56) References Cited

U.S. PATENT DOCUMENTS 6,006,080 A * 12/1999 Kato ................. H04B 1/005
455/188.1
6,876,645 B1 * 4/2005 Guey .................. H04B 1/711
370/342
(Continued)

FOREIGN PATENT DOCUMENTS

WO     WO 2013/05230 A2     1/2013

OTHER PUBLICATIONS

Texas Instruments; "CC2650 Simple Link (TM) Multistandard Wireless MCU"; 52 pages (Feb. 2015).
(Continued)

*Primary Examiner* — Linda Wong

(57) ABSTRACT

A multi-mode transceiver arrangement configured to provide for transmission and reception of signalling of a plurality of wireless sensor network protocols, the transceiver comprising;
  a single transmission path and a plurality of parallel receive paths;
  said transmission path including a modulator element configured to modulate, at any one time, a signal for transmission in accordance with a particular one of the plurality of wireless standards and a frequency reference element configured to provide a reference frequency to generate signalling for the antenna at a predetermined frequency;
  said receive paths each configured to receive signalling over a different, predetermined frequency band and including a demodulator to provide a demodulated signal for processing by a controller configured to provide signals to the transmission path and receive signals from the demodulators for symbol recognition
(Continued)

Figure 1:
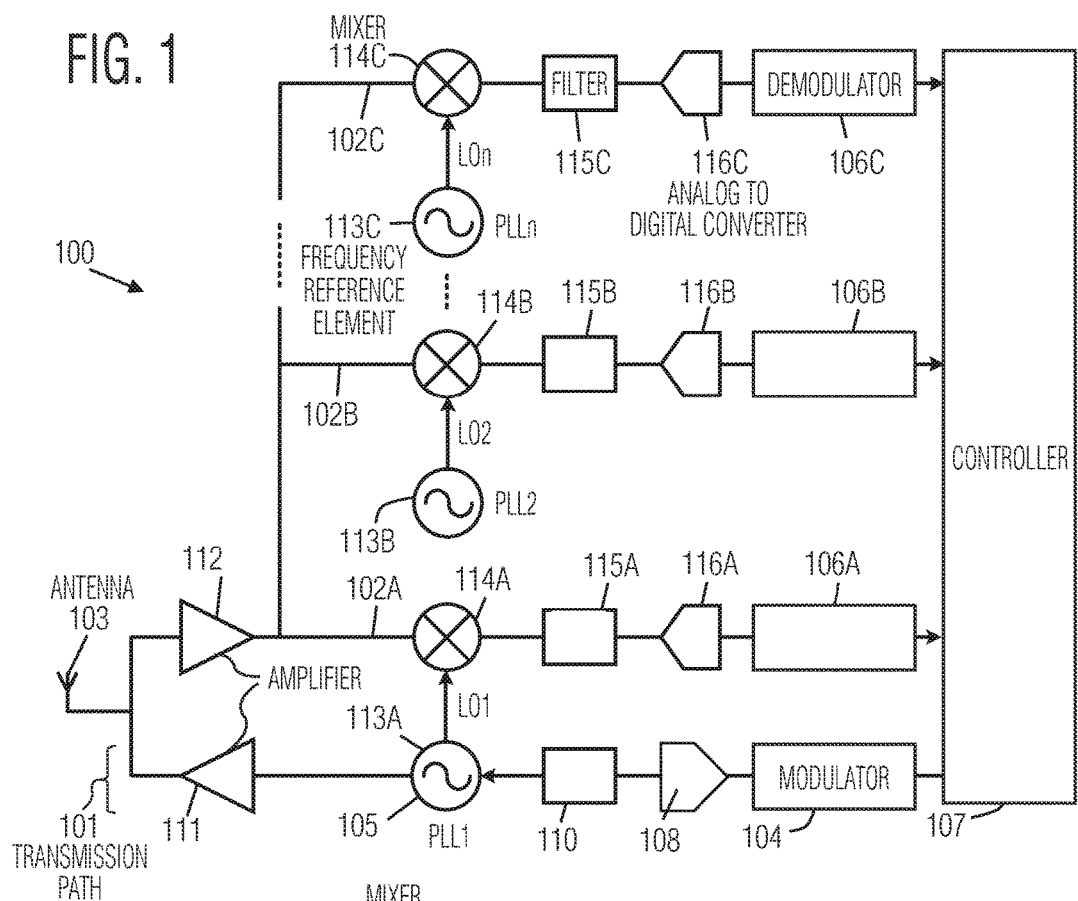

thereby enabling the multi-mode transceiver to communicate with a plurality of wireless sensor networks simultaneously.

18 Claims, 3 Drawing Sheets

(51) Int. Cl.
*H03K 9/00* (2006.01)
*H04B 7/02* (2018.01)
*H04W 4/00* (2018.01)
*H04W 4/70* (2018.01)

(58) Field of Classification Search
USPC ..... 375/240.27, 240.29, 259, 285, 284, 295, 375/299, 316, 302, 303, 304, 322, 324, 375/323, 326, 334, 335, 339, 340, 344, 375/346
See application file for complete search history.

(56) References Cited

U.S. PATENT DOCUMENTS

| | | | |
|---|---|---|---|
| 8,331,289 B1 | 12/2012 | Lee et al. | |
| 2004/0061804 A1 | 4/2004 | Favrat et al. | |
| 2006/0019700 A1 | 1/2006 | Seo et al. | |
| 2006/0053453 A1* | 3/2006 | Kasamatsu | H04H 20/02 725/81 |
| 2006/0292986 A1 | 12/2006 | Bitran et al. | |
| 2007/0147535 A1* | 6/2007 | Niu | H04B 7/0408 375/267 |
| 2007/0285308 A1* | 12/2007 | Bauregger | G01S 19/10 342/357.27 |
| 2009/0219449 A1 | 9/2009 | Van Sinderen et al. | |
| 2010/0040011 A1* | 2/2010 | Kang | H04W 76/048 370/329 |
| 2010/0124300 A1* | 5/2010 | Rajagopal | H04L 5/0048 375/340 |
| 2010/0210208 A1 | 8/2010 | Gorbachov | |
| 2010/0261438 A1* | 10/2010 | Walley | H04B 1/0003 455/77 |
| 2011/0122972 A1 | 5/2011 | Lie et al. | |
| 2011/0189956 A1 | 8/2011 | Gandolfo | |
| 2012/0281533 A1 | 11/2012 | Xhafa et al. | |
| 2012/0329395 A1 | 12/2012 | Husted et al. | |
| 2013/0156134 A1 | 6/2013 | Galan et al. | |
| 2013/0223573 A1* | 8/2013 | Walley | H04B 1/0003 375/340 |
| 2013/0229954 A1 | 9/2013 | Narathong et al. | |
| 2013/0259016 A1 | 10/2013 | Xhafa et al. | |
| 2014/0198689 A1* | 7/2014 | Loh | H04L 27/2601 370/280 |
| 2014/0220921 A1 | 8/2014 | Mo et al. | |
| 2015/0002357 A1* | 1/2015 | Sanford | H01Q 1/525 343/836 |
| 2015/0126146 A1* | 5/2015 | Wang | H04B 1/1027 455/296 |
| 2015/0139348 A1* | 5/2015 | Tong | H04B 7/068 375/267 |
| 2015/0288532 A1 | 10/2015 | Veyseh et al. | |
| 2016/0174226 A1* | 6/2016 | Porat | H04L 5/0044 370/329 |
| 2016/0218852 A1* | 7/2016 | Akula | H03F 3/19 |

OTHER PUBLICATIONS

Freescale Semiconductor, Inc.; Kinetis SW40Z/30Z/20Z Wireless MCUs—Design with multi-mode (BLE/802.15.4) radio Solutions; 2 pages (2015).

* cited by examiner

MULTI-MODE TRANSCEIVER ARRANGEMENT

CROSS-REFERENCE TO RELATED APPLICATIONS

This application claims the priority under 35 U.S.C § 119 of European patent application No. 16290044.3, filed Feb. 26, 2016 the contents of which are incorporated by reference herein.

The present disclosure relates to a multi-mode transceiver arrangement. It also relates to an electronic device including said multi-mode transceiver and a wireless network, such as a wireless sensor network, including said multi-mode transceiver.

Various wireless standards/protocols exist and operate at different frequencies and in accordance with different rules. There is a desire for devices to be more connected in what is termed the Internet of Things. When two or more of these wireless protocols operate in the same frequency band or space, there is the possibility for interference.

According to a first aspect of the present disclosure there is provided a multi-mode transceiver arrangement configured to provide for transmission and reception of signalling of a plurality of wireless network standards, the transceiver comprising;
- a single transmission path and a plurality of parallel receive paths, said transmission path and said receive paths configured to share a single antenna;
- said transmission path including a modulator element configured to modulate, at any one time, a signal for transmission in accordance with a particular one of the plurality of wireless sensor network standards and a frequency reference element configured to provide a reference frequency to generate signalling for the antenna at a predetermined frequency in accordance with said particular one of the plurality wireless sensor network standards;
- said receive paths each configured to receive signalling over a different, predetermined frequency band and including a demodulator to provide a demodulated signal for processing by a controller; and
- said controller configured to provide signals to the transmission path for generation of signalling for transmission and configured to receive signals from the demodulators of the plurality of receive paths representative of received signalling for symbol recognition thereby enabling the multi-mode transceiver to communicate with a plurality of wireless networks simultaneously.

This may be advantageous as the plurality of parallel receive paths provide for simultaneous reception of signalling (which may represent packets) from the plurality of wireless networks as the reception of packets from said plurality of wireless sensor networks is non-time-shared outside times of transmission. In one or more embodiments, the wireless network standards comprise wireless sensor network standards. Thus it may be advantageous for the transceiver arrangement to provide for the ability to be part of two or more networks simultaneously (e.g. ZigBee/Thread or ZigBee/BLE or Thread/BLE).

In one or more embodiments, each receive path includes a frequency reference element configured to provide for extraction of the predetermined frequency band associated with each receive path. Thus, the frequency bands may correspond to predetermined channels of the wireless network standard.

In one or more embodiments, the frequency reference element associated with one of the plurality of receive paths is provided by the frequency reference element of the transmission path. In one or more embodiments, a frequency reference element independent of the frequency reference element of the transmission path is provided for sharing by two or more or all of the receive paths.

In one or more embodiments, the plurality of receive paths include a single frequency reference element and at least one receive path includes a frequency reference shift element configured to shift the frequency provided by the frequency reference element by an amount to provide for extraction of the predetermined frequency band associated with said at least one receive path. In one or more embodiments, each receive path is configured to receive a different frequency reference signal derived from a single frequency reference element by virtue of one or more frequency reference shift elements.

In one or more embodiments, one of the receive paths is configured to receive a non-frequency-shifted reference frequency and each of the remaining receive paths include a frequency reference shift element configured to shift the frequency provided by the frequency reference element by a different amount to provide for extraction of the predetermined frequency band associated with each receive path.

In one or more embodiments, said frequency reference element of the transmission path provides said single frequency reference element of the plurality of receive paths. In one or more embodiments the plurality of receive paths each include an analogue to digital converter (ADC) wherein the sampling rate of each ADC is based on the predetermined frequency band of the receive path of which it is part. Thus, the ADC sampling may be increased in order to cover the bandwidth of the plurality of receive paths In one or more embodiments, the frequency reference element(s) may comprise a phase locked loop.

In one or more embodiments, each of the plurality of receive paths includes a mixer element, the mixer element configured to receive a different reference frequency for operating the mixer to receive the signalling over a different, predetermined frequency band. In one or more embodiments, one or more or each of the plurality of receive paths includes a digital down convertor configured to provide signalling for demodulation at the frequency associated with its receive path.

In one or more embodiments, at least two of the plurality of receive paths include a common mixer element configured to extract a signal extending over the different predetermined frequency bands associated with those at least two receive paths and a common analogue to digital converter configured to receive said signal, said analogue to digital convertor configured to provide a digital output to a plurality of demodulators, each demodulator defining at least part of each of the at least two of the plurality of receive paths.

In one or more embodiments, all of the plurality of receive paths include a common mixer element and a common analogue to digital converter and individual demodulators configured to each provide a demodulated signal to said controller representative of the associated predetermined frequency band.

In one or more embodiments, the plurality of receive paths include a common wideband analogue to digital convertor configured to provide a digital signal representative of signalling received across the frequency bands of the receive paths associated with the common wideband analogue to digital convertor.

In one or more embodiments, each receive path includes a digital down converter element prior to said demodulator and configured to extract a particular channel frequency for receipt by the controller, the particular channel frequency associated with one or more of the wireless network standards.

In one or more embodiments, the plurality of wireless network standards comprise two or more of;
  Zigbee, Thread, Bluetooth, Bluetooth LE, WiFi or one of a plurality of protocols based on IEEE standard 802.15.4.

In one or more embodiments, the controller and/or electronic components present in the transmission and/or receive paths are configured to provide for packet arbitration comprising at least one or more of the following rules;
  i) provide for simultaneous reception by any two or more of the plurality of receive paths outside a time period defined by use of the antenna by the transmission path;
  ii) provide for forbidding of the use of the transmission path during a time period defined by the reception of signalling at one or more of the receive paths;
  iii) provide for forbidding of the simultaneous transmission of signalling of two or more of the plurality of wireless sensor network standards if there is overlap of carrier frequencies associated with said signalling of the two or more of the plurality of wireless network standards.

According to a second aspect of the present disclosure there is provided an electronic device including the multi-mode transceiver arrangement of the first aspect, the electronic device comprising any one of a router or hub of a wireless sensor network.

According to a third aspect of the present disclosure there is provided a wireless sensor network comprising a plurality of nodes wherein at least one of said nodes includes the multi-mode transceiver arrangement of the first aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DECRIPTION OF DRAWINGS

Figure 2:
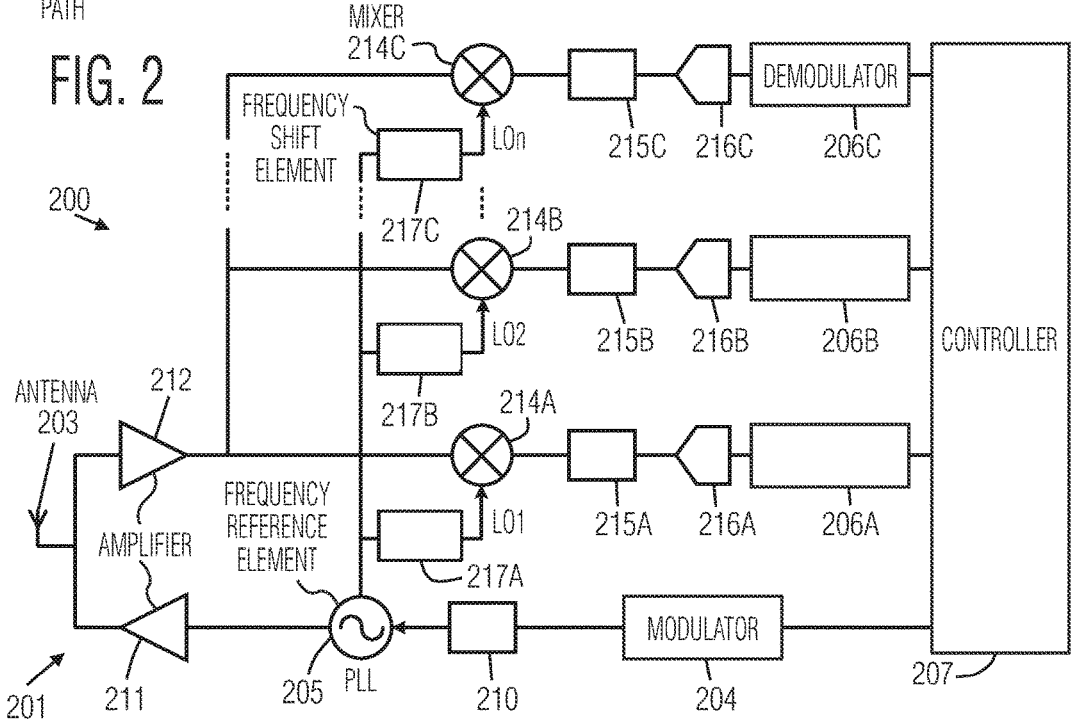
Figure 3:
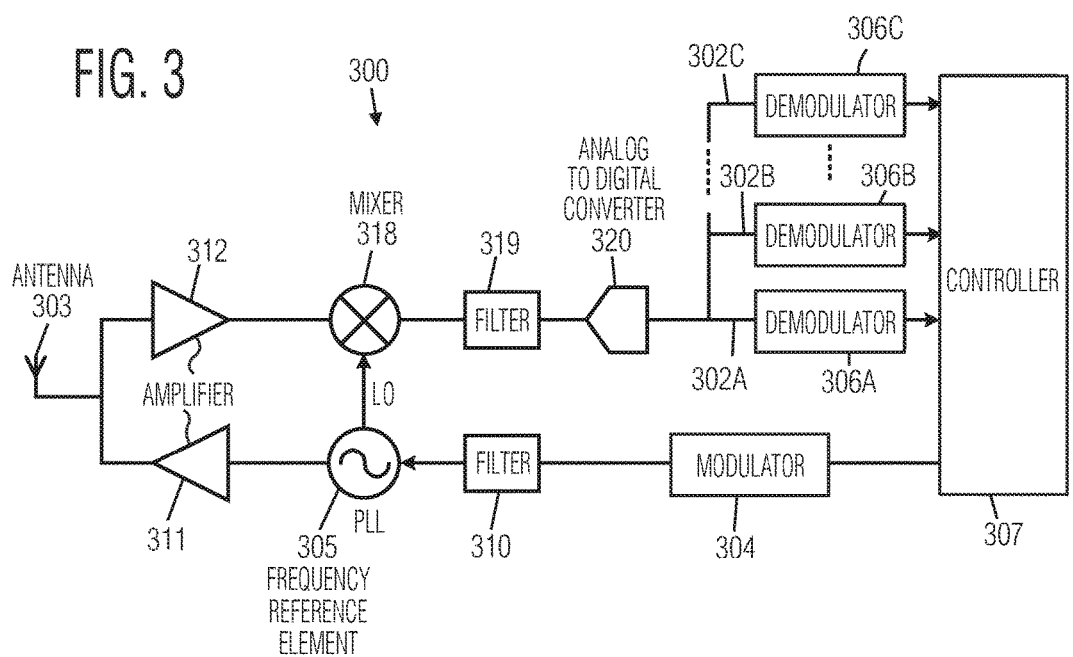
Figure 4:
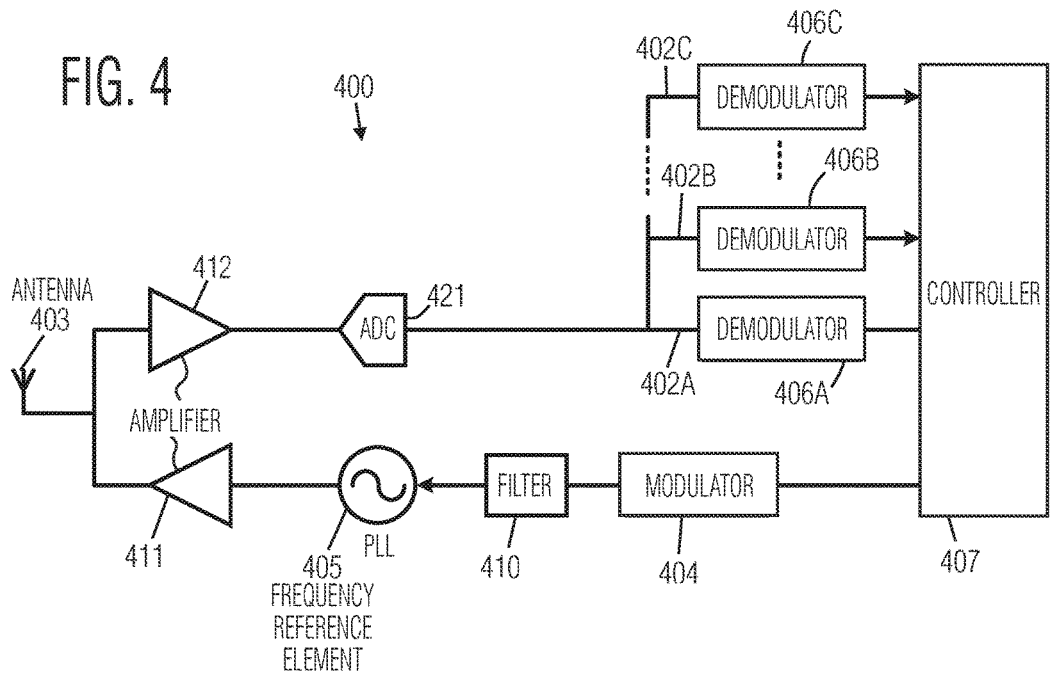
Figure 5:
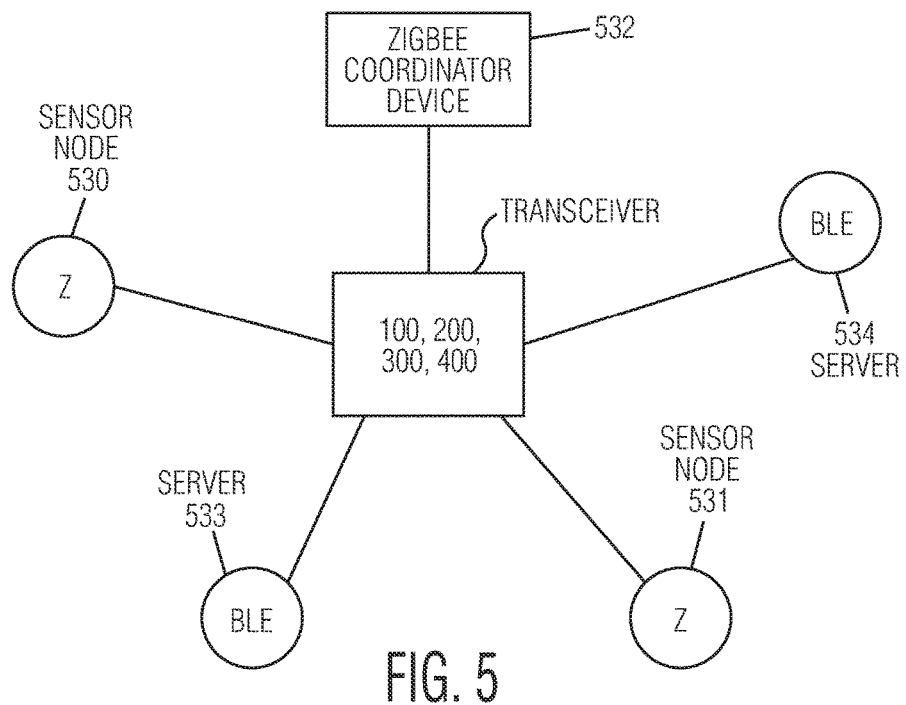
Figure 6:
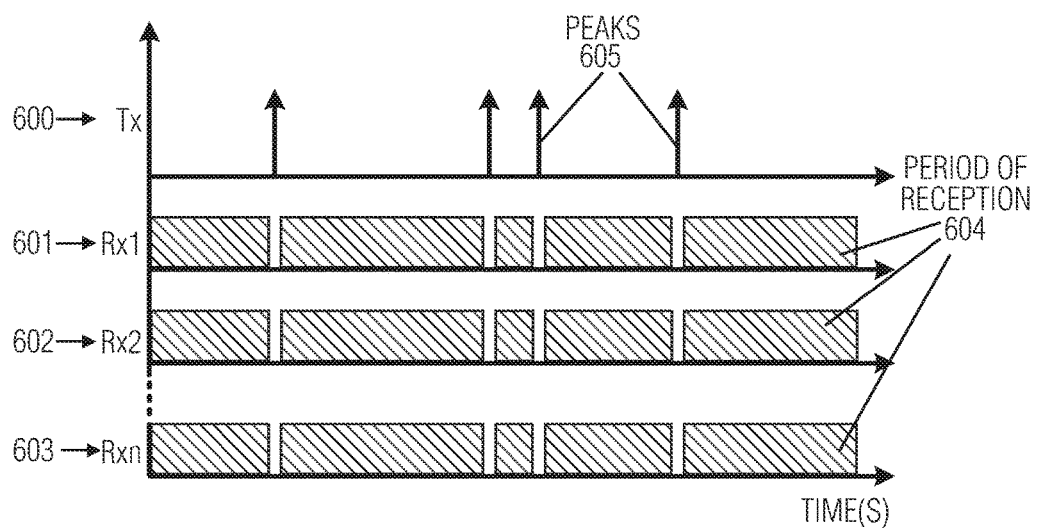

One or more embodiments will now be described by way of example only with reference to the accompanying drawings in which:

FIG. 1 shows a first example embodiment of a multi-mode transceiver;
FIG. 2 shows a second example embodiment of a multi-mode transceiver;
FIG. 3 shows a third example embodiment of a multi-mode transceiver;
FIG. 4 shows a fourth example embodiment of a multi-mode transceiver;
FIG. 5 shows an example plurality of wireless sensor networks;
FIG. 6 shows a timing diagram illustrating the use of the antenna by the transmission and receive paths.

DETAILED DESCRIPTION

FIG. 1 shows a first example multi-mode transceiver 100 configured to provide for transmission and reception of signalling to/from a plurality of wireless (e.g. sensor) networks of different types, standards or protocols (hereinafter "standards"). For example, in this example, the transceiver 100 may be configured to belong to two or more wireless sensor networks operating in accordance with the ZigBee specification as well as the Bluetooth Low Energy (LE) specification. However, it will be appreciated that the transceiver may be configured to operate, simultaneously, in accordance with any other plurality of specifications such as Thread, 6LoWPAN or WirelessHART or different combinations thereof.

The transceiver 100 comprises a single transmission path 101 and a plurality of parallel receive paths 102A, 102B, 102C, said transmission path 101 and said receive paths 102A, 102B and 102C configured to share a single antenna 103. The transmission path 101 includes a modulator element 104 configured to modulate, at any one time, a signal for transmission in accordance with a particular one of the plurality of wireless sensor network standards and a frequency reference element 105 configured to provide a reference frequency to generate signalling for the antenna 103 at a predetermined frequency in accordance with said particular one of the plurality wireless network standards. The frequency reference element may be considered as a frequency synthesiser. Thus, frequency reference element 105 may provide for channel selection and may be modulated by modulator element 104 when transmitting. When receiving, the reference frequency from reference frequency element 105 is unmodulated and, in some examples, provides for channel selection only as will be described below. Said receive paths 102A, 102B, 102C are each configured to receive signalling over a different, predetermined frequency band and include a demodulator 106A, 106B, 106C configured to provide a demodulated signal for processing by a controller 107.

The controller 107 is configured to provide signals to the transmission path 101 for generation of signalling for modulation (by modulator 104) and transmission. The controller may be configured to receive signals from the demodulators 106A, 106B, 106C of the plurality of receive paths 102A, 102B, 102C representative of received signalling for symbol recognition (such as by the controller 107 or other element). Thus, the plurality of receive paths provide for simultaneous reception of signalling/packets from the plurality of wireless sensor networks and accordingly the multi-mode transceiver 100 is able to communicate with a plurality of wireless sensor networks simultaneously. This may be advantageous as the plurality of parallel receive paths provide for simultaneous reception of packets from the plurality of wireless sensor networks. The multimode transceiver 100 may thus be able to capture, in parallel, packets coming from the different networks in order to respond, when the radio channel is available, in the good time to the source of the packets. As packet loss due to time shared reception is reduced/avoided, then packet sending retries may be limited in wireless networks to which the transceiver belongs. As a consequence the Quality of Service of the networks is high because the latency of messages exchanges may not be significantly increased. Hence activity in each of the wireless sensor networks is also not significantly increased. This may have additional benefits as the lifetime of battery powered nodes in the wireless sensor networks may be prolonged.

The provision of a single multi-mode wireless transceiver that supports concurrent mode operation over the plurality of wireless sensor networks (WSN) may provide for:

Low latency transceiver architecture for concurrency support due to a wideband multi-path receiver chain designed for reception of multiple wireless standards over its multiple frequency channels thereby assuming the role of multiple modems working in parallel. Latency in the WSN transactions may be low. The transmission path may be used in Time Domain Multiplex operation with the plurality of receiver paths, and thus only one transmission path may need to be considered for coexistence issues.

Bill of material can be optimized by mutualizing antenna.

Optimal synchronisation of the dual mode/multimode activity thanks to collaborative coexistence strategy. For example, time division in between ZigBee packet transaction & a BLE connection event. For example, the transceiver may skip one or more ZigBee packets when a Bluetooth LE connection event is on-going and/or the controller is configured to reserve time for ZigBee transmission between Bluetooth LE connection events. Further, packet traffic arbitration may be implemented at the transmitter level such that packets are prioritized and queued on a common queue for transmission via the transmission path 101.

Low energy consumption compared to two (or more dependent on the number of wireless networks supported) wireless MCUs (microcontroller units).

Low cost as the component die area may be lower—a single package may be used and die area may be small due to optimization of the transceiver architecture.

Low complexity for the consumer due to provision of a fully integrated solution and a single unified Software Design Kit.

As a consequence of the availability of a wideband multi-receive-path transceiver:

a Bluetooth LE scanner may detect the presence of a Bluetooth LE advertiser in its vicinity with less latency than in case of a narrowband receiver that has to sequentially scan the (three) advertising frequencies. As a result, connection time may be quicker.

coexistence robustness can be implemented easily and more efficiently. Indeed, coexistence algorithms may need a sensing receiver function to detect/predict the presence of interference in order to set-up countermeasures. With a narrowband receiver the sensing operation may need to stop ZigBee/Bluetooth LE packet transaction support to perform this function. With a wideband receiver as described herein, for example, a Zigbee router/coordinator radio receiver controller may be configured to scan the whole RF band ranging from 2400 to 2483.5 MHz in order to detect the free channels in the 2.4 GHz spectrum. In this way, the router/coordinator controller can determine the radio environment and can refrain from transmission on frequencies when interference is high while continuing to transparently manage the end devices. In one or more examples, the multi-mode transceiver may be configured to or controller to scan the whole frequency band for packetized blockers, such as Wi-Fi, that may interfere with reception/transmission in order to identify the inter-packet gap timings that may be available for ZigBee or Bluetooth LE transmission.

The transmission path 101 may include an analogue to digital converter 108 to receive the digital signal from the modulator 104 and provide an analogue signal. The transmission path 101 includes a filter 110 configured to pass frequencies over the total range of frequencies that the plurality of wireless sensor networks operate over. The filter 110 may be configured to construct the analogue signal by removing signal replicas located at multiples of the sampling frequency. It may be important to avoid the polluting of adjacent channels or other frequency bands. The filter may be a reconstruction filter when a DAC is used in the modulator. Further, the filter may be a filter for a proprietary mode where the sidebands of the wanted channel spectrum are reduced, thus potentially reducing the parasitic emissions. Moreover frequency reference element 105 may comprise a voltage controlled oscillator (VCO) modulated in open-loop or embedded in a synthesizer loop and modulated according to two point modulation techniques. Thus, the VCO may have two inputs: one driven by the synthesizer loop and one driven by the signal from modulator 104/filter 108. Thus, the element 105 may be considered a reference element when it selects the carrier frequency and a modulator in the analogue domain when modulated by modulator 104. The filtered signal is then mixed with the transmission frequency as provided by the frequency reference element 105 before being amplified by an amplifier 111, such as a low noise amplifier, and applied to the antenna 103. The frequency reference element may comprise a phase locked loop. Access to the transmission path for transmission of signalling may be time-shared between the standards of the wireless sensor networks, such as by controller 107. The transmission path 101 may be used in Time Division Multiple Access (TDMA) mode. Accordingly it may not be possible to receive and to transmit at the same time (which is regular behaviour regarding the individual definition of the Zigbee & BLE standards). The controller 107 may also facilitate the collaborative coexistence strategy (packet traffic arbitration) between the wireless sensor network standards and/or between the transmissions and receive paths.

The time sharing of the single transmission path may be priority based wherein the priority is assigned by each of the protocol stacks of each of the respective wireless sensor networks. The priority may be based on timing associated with the receipt of a packet (i.e. signalling representing the packet) and the protocol to which the packet belongs. For example, one or more protocols may require a response or acknowledgement to be sent on receipt of a packet/message within a predetermined time period. Further, one or more protocols may only provide for retrying the sending of a packet/message a limited number of times if an acknowledgement of receipt by a receiver is not received. Further, one or more protocols may require a predetermined exchange of packets/message in order to maintain an active connection to the wireless sensor network. The priority may be based on any one or more of these requirements and the packets with the higher priority may be provided for transmission preferentially, at least some of the time, to packets with a lower priority.

In this example, the plurality of receive paths 102A, 102B, 102C share a common amplifier 112 although in other examples, each receive path may have its own amplifier or a plurality of shared amplifiers may be shared by (distinct or overlapping) groups of the plurality of receive paths. In this example, the amplifier 112 is configured to provide an amplified signal over a frequency band corresponding to the total range of frequencies in which the plurality of wireless sensor networks operate. For a Zigbee and Bluetooth LE transceiver, this frequency range may be 2400 MHz-2483.5 MHz.

In one or more examples, each receive path 102A, 102B, 102C includes a frequency reference element 113A, 113B, 113C respectively configured to provide a local oscillator for extraction of the predetermined frequency band associated with each receive path 102A, 102B, 102C. Each receive path may correspond to one of the channels of one or more of the plurality of standards. Thus, the frequency of the frequency reference element is selected based on the frequency channels of the wireless sensor networks with which the transceiver is configured to operate. The frequency reference element 113A, 113B, 113C may comprise phase locked loops. In this example, the frequency reference element 113A associated with the receive path 102A is provided by the frequency reference element 105 of the transmission path 101. Each receive path further includes a mixer 114A, 114B, 114C configured to receive the frequency reference signal from its respective frequency reference element 113A, 113B, 113C as well as the amplified signalling. From the amplifier 112, each receive path 102A, 102B, 102C receives the signalling and the mixer 114A, 114B, 114C and respective frequency reference element 113A, 113B, 113C provide for dividing the received, amplified signalling into each different, predetermined frequency band. Accordingly, the receive paths 102A, 102B, 102C can receive, simultaneously, signalling over the different frequency bands.

Each receive path 102A, 102B, 102C may further include a respective filter 115A, 115B, 115C configured to act as anti-aliasing filters and/or filter out-of-frequency band signals. Thus, the filters 115A-C may participate to out-of-channel blocker removal, to limit noise bandwidth for sensitivity optimization. The filters may be configured to at least partly remove the unwanted signals (blockers) then the dynamic range of the ADC may be relaxed. Further blocker filtering may be performed (in any of the examples herein) in the digital domain by a match filter located in a first stage of each of the demodulators 106A-C. Such a filter may be configured to remove mixing products generated during the down-mixing process.

Each receive path 102A, 102B, 102C may further include a respective analogue to digital converter 116A, 116B, 116C (ADC) which may be configured to receive the analogue (optionally filtered by 115A/B/C) signalling from the respective mixer 114a, 114B, 114C. The digital output of each of the ADCs is provided to the respective demodulator 106A, 106B, 106C for demodulation and, optionally, symbol recognition and for receipt by the controller 107. The controller 107 may perform frame recognition (and/or symbol recognition if not performed by the demodulator) and optionally for higher protocol layer processing.

FIG. 2 shows a second example embodiment. The same reference numerals have been used for like components with the addition of "100". Thus, the numberings uses the format "2xx" to correspond to the equivalent part numbered "1xx" in FIG. 1.

The embodiment of FIG. 2 is substantially similar to that shown in FIG. 1 except that the (local oscillator) frequency reference element 113A, 113B, 113C that provides the respective mixer 114a, 114B, 114C with the reference frequency is provided by a single frequency reference element 205 and each receive path includes a respective frequency shift elements 217A, 217B, 217C. In this example the frequency reference element 205 is associated with the transmission path 201 but it will be appreciated that a frequency reference element for the transmission path 201 may be provided and a separate frequency reference element for two or more receive paths may be provided. The frequency shift elements 217A, 217B, 217C are each configured to provide a reference frequency, shifted by a different predetermined amount, to their associated mixer 214A, 214B, 214C. Accordingly, each receive path 202A, 202B, 202C is configured to receive signalling in a distinct frequency band defined by the reference frequency of element 205 shifted by a fixed amount by the frequency shifter elements 217A, 217B, 217C.

This arrangement may be advantageous if the different channels to be received by the plurality of receive paths are located in a similar band of frequencies and are relatively close to one another. This layout may be advantageous in respect of die area and current consumption as fewer or only one phase locked loop is used. The transmission path may include an ADC similar to ADC 108.

FIG. 3 shows a further example embodiment. Again the same reference numerals are used as shown in FIG. 1 but with the addition of "200" thereby meaning the components are numbered in the format "3xx". When the different channels for receipt by the transceiver 300 are located in the same/similar band of frequencies and are relatively close to each other, then die area and the current consumption may be improved by using a shared RF analogue receive path composed of only one PLL, one mixer followed by a plurality of demodulators running in parallel. For ZigBee/BLE for instance the range is 83.5 MHz (2400 MHz-2483.5 MHz).

Accordingly, the plurality of receive paths 302A, 302B, 302C share a mixer 318, a filter 319 and an analogue to digital converter 320. The output of the analogue to digital converter 320 is then configured to split into individual separate paths to provide digitized signalling to the demodulators 306A, 306B, 306C. In some examples, in front of each demodulator there may be a Digital Downconverter in order to provide for selection of the proper channel. The filter 319 and the ADC 320 are, in this example, wideband to cover the total range of frequencies the transceiver 300 is expected to receive from the plurality of wireless networks. For ZigBee/BLE for example the range is 83.5 MHz (2400 MHz-2483.5 MHz). The shared part of the receive paths (components 312, 318, 319, 320) is based on a single conversion architecture however it may be based on a different architecture, such as super-heterodyne or sliding-IF among others that offer the capability to cover the full frequency band of interest. Further, the PLL 305 may be configured to select, for instance, a substantially central frequency of the frequency band of interest (with mixer 318). Then the exact frequency of each of the receive paths 302A, 302B, 302C may be determined in advance of each of the demodulators 306A, 306B, 306C by a respective Digital Down-Converter (DDC) before processing for effective symbol recognition.

The ADC 320 may be configured to use a delta-sigma or SAR or other ADC architecture depending on system requirements which may include Signal to Noise ratio, energy/current consumption and/or bandwidth constraints. In a further example and as current consumption may increase with the sampling frequency, interleaving a plurality of ADCs (SAR based for instance) in parallel may provide for a balance between bandwidth capability and energy consumption.

A time-interleaved SAR analogue to digital converter may be configured to provide an arrangement of M parallel ADCs elements, which each have the same sampling rate but different phases and which alternately take one sample (time-interleaved sampling). Hence it appears as if they were a single converter operating at an M times higher sampling rate. Thereby, the sampling frequency of one ADC does not need to fulfil the Nyquist criterion; however, when in the digital domain all samples are merged into one output sequence the overall sampling frequency fulfils the Nyquist criterion. Therefore, sampling with an ideal time-interleaved ADC with M parallel ADCs elements is equivalent to sampling with an ideal ADC with an M times higher sampling rate. The parallel ADCs unit of a time-interleaved ADC can be realized in different converter technologies for different requirements, such as to achieve high-rate and low-power ADCs or high-rate and high-resolution ADCs, and so on. The typical structure of a time-interleaved ADC comprises an analogue input configured to receive an analogue input signal xa(t), the input branching to the M time-interleaved parallel ADC elements operating with a "slower" sampling frequency of fs/M, and a multiplexer (MUX) to combine the digital outputs of the parallel ADC elements into one single digital output y(n) with a "higher" sampling frequency fs. The conversion rate of the overall system may increase by the number of parallel ADC units M. Each time an analogue sample is taken by a sample & hold input function, a digital output may be produced. Hence, each parallel ADC unit has a sampling period of M·TS, whereas the time-interleaved system has a sampling period of TS. Further, each parallel ADC element may have to deal with the entire analogue input signal xa(t), and, therefore, the sample-and-holds in each branch or channel may have to resolve the full input signal bandwidth. Moreover, the "sample-and-holds" provide samples for each parallel ADCs elements with a phase/delay of TS from a preceding ADC element.

In one or more examples, the sampling frequency may be dynamically adjusted to provide the minimum value necessary to accommodate any frequency offset between the bands used by the different wireless networks. In one or more examples, when using an interleaved ADC arrangement to provide a plurality of frequency band slices, one or more frequency band slices may be ignored or the ADC selectively stopped to optimize the balance between the sampling frequency and bandwidth.

The transmission path may include an ADC similar to ADC 108.

FIG. 4 shows a further example embodiment. Once again the same reference numerals are used as shown in FIG. 1 but with the addition of "300" thereby meaning the components are numbered in the format "4xx". In this example, the mixer 318 and filter 319 are absent and a wideband, high speed ADC 421 is provided and shared by each of the plurality of receive paths 402A, 402B, 402C. Accordingly, following the ADC 421, the digital output thereof is distributed to each of the receive paths for demodulation by the demodulators 406A, 406B, 406C. Digital down-convertors (not shown) may be provided in each of the receive paths in advance of the demodulators 406A, 406B, 406C such that the exact frequency band of each of the receive paths 402A, 402B, 402C may be provided for demodulation. The high speed ADC 421 may be implemented as a time interleaved analogue to digital converter, as described above.

In this example current consumption may be less important, such as if the transceiver 400 is mains powered (e.g. comprises a router of one or more of the wireless networks). Thus, this example effectively comprises a full spectrum receiver with a plurality of demodulators running in parallel receive paths. The ADC 421 may comprise an ultra-wideband to cover the whole frequency spectrum of interest.

Accordingly, with reference to Nyquist sampling frequency selection criteria, the sampling frequency may be at least twice the upper bound of the signal bandwidth. For example for the 2.4 GHz ISM band then upper bound is 2483.5 MHz. It will be appreciated that while one ultra-wideband ADC may be provided, in other examples a plurality of ADCs covering different frequency ranges may be used and interleaved together. An alternative may be to use a band-pass sampling architecture. Band-pass sampling (also referred to as harmonic sampling) is the techniques of sampling rates lower than the highest frequency of interest to achieve frequency conversion from RF to low IF or base band through intentional aliasing and to be able to exactly reconstruct the information content of the sampled analogue signal if it is a band-pass signal. The sampling requirement is no longer based on the RF carrier, but rather on the information bandwidth of the signal. Thus the resulting processing rate may be significantly reduced.

The transmission path may include an ADC similar to ADC 108.

FIG. 5 shows the transceiver 100, 200, 300, 400 as belonging to a plurality of wireless sensor networks simultaneously. In particular, the transceiver is shown acting as a router in a Zigbee wireless sensor network with connections to two Zigbee sensor nodes 530, 531. The transceiver also provides sensor information received from the sensor nodes 530, 531 to a further device 532, such as a ZigBee Coordinator. The transceiver 100, 200, 300, 400 also simultaneously receives signalling from a Bluetooth LE wireless sensor networks, which in this example, comprises two nodes 533, 534 (or servers) and the transceiver may act as a client.

The controller 107, 207, 307, 407 may be configured to process the signalling (packets) received via the plurality of receive paths in accordance with the standards of the wireless sensor networks to which the transceiver is configured to belong. Accordingly, the controller may include a queue for serial processing of the signalling/packets, which may be received simultaneously on any two or more of the receive paths. In other examples, the symbol recognition and/or other processing of the signalling/packets may be performed in parallel by the controller 107. Thus, the controller, at any one time may be configured to determine, based on signalling received by one or more of the plurality of receive paths in accordance with a first of the plurality of wireless networks and signalling received by one or more of the plurality of receive paths in accordance with a second of the plurality of wireless networks and a queue of packets/signalling to be transmitted on by the transmission path 101, 201, 301, 401, determine an order and/or length and/or pattern of transmission and receive time periods in accordance with a predetermined service requirement guidelines of each of the plurality of wireless networks. The service requirement guidelines may be determined based on the number of retries a wireless network node will make before discontinuing attempts or a maximum response time to send an acknowledgement of receipt of signalling/a packet.

While the transceiver arrangement may be used to simultaneously receive signalling from a plurality of wireless network standards in general it may be particularly suitable for wireless sensor networks.

The controller 107 may be configured to provide a transceiver for simultaneous reception/transmission of Bluetooth LE (BLE) and Zigbee.

A BLE network is composed by a master and its slaves, which is called a piconet, and may follow a star topology. Currently, a BLE device can only belong to one piconet.

BLE slave can be considered as an end-device while the BLE Master is a single router/hub device. Future releases of the BLE standard will embed mesh networking with multi-hop capability. In order to save energy, slaves/end devices are in sleep mode by default and wake up periodically to listen for possible packet receptions from the master/router or to send packet to the master/router.

The BLE master determines the instants in which slaves are required to listen, and thus coordinates the medium access by using a Time Division Multiple Access (TDMA) scheme. The master also provides the slave with the information needed for the frequency hopping algorithm (including the map of data channels to be used) and for the connection supervision. Once a connection between a master and a slave is created, the physical channel is divided into non-overlapping time units called connection events. Within a connection event, all packets are transmitted using the same data channel frequency. Every connection event starts with the transmission of a packet by the master. If the slave receives a packet, the slave must send a packet to the master in response. However, the master is not required to send a packet upon receipt of a packet from the slave. At least, an Inter Frame Space (IFS) of 150 µs must pass between the end of the transmission of a packet and the start of the next one. While master and slave continue to alternate in sending packets, the connection event is considered to be open. If none of the devices has any more data to transmit, the connection event will be closed and the slave will not be required to listen until the beginning of the next connection event.

BLE Link Layer connections use a stop-and-wait flow control mechanism based on cumulative acknowledgments, which at the same time provides error recovery capabilities. When a device receives a data channel packet, its next transmitted packet will serve as an acknowledgement.

In the ZigBee network case, each device supporting one node of the network communicates with its neighbouring nodes in order to form an overall network in which a router node repeats transmissions received from other sensor nodes to relay packets through the overall wireless sensor network (WSN). A Hub node manages all the data coming from the WSN and may connect a third part network (e.g. WiFi) for further data processing or remote control.

Communication through the physical channel of a ZigBee network isn't divided into non-overlapping time units or slots. End devices send, periodically, packets to its neighbouring router device. But child end devices, depending from a parent router node, are not synchronized each together. Therefore a router node must be always in listening mode (receive mode) except when it is transmitting. Hence the router is able to capture, as soon as possible, packets coming from its children nodes in order to achieve low latency. Once setup, a ZigBee network operates on a fixed data channel frequency by using a Time Division Multiple Access (TDMA) scheme. The packet transmission collision avoidance is managed by adopting a Listen before Talking (CSMA/CD) scheme. Indeed if a node wants to transmit, it listens first to the air interface to see if there is already another ongoing transmission (with or without carrier sensing). If so it waits, otherwise it transmits the packet. Every transaction is triggered by a sender node with the transmission of a packet. If the receiver node receives a packet, it must send an acknowledgment packet to the sender in response. However, the sender resend the packet (considering a maximum number of trials) upon receipt of an acknowledgment packet from the receiver node. At least, an Inter Frame Space (IFS) of 192 µs must pass between the end of the transmission of a packet and the start of the acknowledgment one.

Hence as with the BLE Link Layer, the ZigBee MAC Layer connections use a kind of "stop-and-wait like flow" control mechanism based on acknowledgments. When a device receives a data channel packet, its next transmitted packet will serve as an acknowledgement.

The controller may be configured to identify periods of time when operation is not required in the BLE network for instance and then try to perform required tasks in the ZigBee network context during those periods. The transceiver arrangement described herein may advantageously provide for communication with BLE and Zigbee networks.

FIG. 6 shows the power at the antenna from the transmission path at 600 and each receive path at 601, 602, 603. The controller 107, 207, 307, 407 and/or electronic components present in the transmission and/or receive paths are configured to provide for packet arbitration comprising at least one or more of the following rules;
i) Provide for simultaneous reception by any two or more of the plurality of receive paths outside a time period defined by use of the antenna by the transmission path (shown by blocks 604).
ii) Provide for forbidding of the use of the transmission path during a time period defined by the reception of signalling at one or more of the receive paths, as shown in FIG. 6 use of the transmission path shown by peaks 605 occur between period of reception 604.
iii) Provide for forbidding of the simultaneous transmission of signalling of two or more of the plurality of wireless sensor network standards if there is overlap of carrier frequencies associated with said signalling of the two or more of the plurality of wireless network standards.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A multi-mode transceiver arrangement configured to provide for transmission and reception of signaling of a plurality of wireless network standards, the transceiver comprising:
    a single transmission path and a plurality of parallel receive paths,
    said transmission path and said receive paths configured to share a single antenna;
    said transmission path including
        a modulator element configured to modulate, at any one time, a signal for transmission in accordance with a particular one of the plurality of
    wireless network standards and
        a frequency reference element configured to provide a reference frequency to generate signaling for the antenna at a predetermined frequency in accordance with said particular one of the plurality wireless network standards;

said receive paths each configured to receive signaling over a different, predetermined frequency band and including
a demodulator to provide a demodulated signal for processing by a controller; and
said controller configured to provide signals to the transmission path for generation of signaling for transmission and configured to receive signals from the demodulator in each of the plurality of receive paths representative of
received signaling for symbol recognition thereby enabling the multi-mode transceiver to communicate with a plurality of wireless networks simultaneously; and
wherein at least two of the plurality of receive paths include
a common mixer element configured to extract a signal extending over the different predetermined frequency bands associated with those at least two receive paths and
a common analogue to digital converter configured to receive said extracted signal said analogue to digital convertor configured to provide a digital output to the plurality of demodulators,
each of the plurality of demodulators defining at least part of each of the at least two of the plurality of receive paths.

2. The multi-mode transceiver arrangement of claim 1, wherein each of the receive paths include a frequency reference element configured to provide for extraction of the predetermined frequency band associated with each receive path.

3. The multi-mode transceiver arrangement of claim 2, wherein the frequency reference element associated with one of the plurality of receive paths is provided by the frequency reference element of the transmission path.

4. The multi-mode transceiver arrangement of claim 1, wherein the plurality of receive paths include a single frequency reference element and at least one receive path in the plurality of receive paths includes a frequency reference shift element configured to shift the frequency provided by the frequency reference element by an amount to provide for extraction of the predetermined frequency band associated with said at least one receive path.

5. The multi-mode transceiver arrangement of claim 4, wherein
one of the plurality of receive paths is configured to receive a non-frequency-shifted reference frequency and
each remaining of the plurality of receive paths include a frequency reference shift element configured to shift the frequency provided by the frequency reference element by a different amount to provide for extraction of the predetermined frequency band associated with each of the remaining of the plurality of receive paths.

6. The multi-mode transceiver arrangement of claim 4, wherein said frequency reference element of the transmission path provides said single frequency reference element of the plurality of receive paths.

7. The multi-mode transceiver arrangement of claim 1, wherein
each of the plurality of receive paths includes a mixer element,
the mixer element configured to receive a different reference frequency for operating the mixer to receive the signaling over a different, predetermined frequency band.

8. The multi-mode transceiver arrangement of claim 1, wherein all of the plurality of receive paths include
a common mixer element and a common analogue to digital converter and
individual demodulators configured to each provide a demodulated signal to said controller representative of the associated predetermined frequency band.

9. The multi-mode transceiver arrangement of claim 1, wherein the plurality of receive paths include a common wideband analogue to digital convertor configured to provide a digital signal representative of signaling received across the frequency bands of the receive paths associated with the common wideband analogue to digital convertor.

10. The multi-mode transceiver arrangement of claim 1, wherein
each of the plurality of receive paths include a digital down converter element prior to said demodulator and configured to extract a particular channel frequency for receipt by the controller,
the particular channel frequency associated with one or more of the plurality of wireless network standards.

11. The multi-mode transceiver arrangement of claim 1, wherein the plurality of wireless network standards comprise two or more of:
Zigbee, Thread, Bluetooth, Bluetooth LE, WiFi or one of a plurality of protocols based on IEEE standard 802.15.4.

12. The multi-mode transceiver arrangement of claim 1, wherein with the controller and/or electronic components present in the transmission and/or receive paths are configured to provide for packet arbitration comprising at least one or more of the following rules:
provide for simultaneous reception by any two or more of the plurality of receive paths outside a time period defined by use of the antenna by the transmission path;
provide for forbidding of the use of the transmission path during a time period defined by the reception of signaling at one or more of the receive paths;
provide for forbidding of the simultaneous transmission of signaling of two or more of the plurality of wireless network standards if there is overlap of carrier frequencies associated with said signaling of the two or more of the plurality of wireless network standards.

13. An electronic device including the multi-mode transceiver arrangement of claim 1,
the electronic device comprising any one of a router or hub of a wireless sensor network.

14. A wireless sensor network comprising a plurality of nodes wherein at least one of said nodes includes the multi-mode transceiver arrangement of claim 1.

15. A multi-mode transceiver arrangement configured to provide for transmission and reception of signaling of a plurality of wireless network standards, the transceiver comprising;
a single transmission path and a plurality of parallel receive paths,
said transmission path and said receive paths configured to share a single antenna;
said transmission path including
a modulator element configured to modulate, at any one time, a signal for transmission in accordance with a particular one of the plurality of wireless network standards and a frequency reference element configured to provide a reference frequency to generate signaling for the antenna at a predetermined frequency in accordance with said particular one of the plurality wireless network standards;

said receive paths each
- configured to receive signaling over a different, predetermined frequency band and
- including a demodulator to provide a demodulated signal for processing by a controller; and said controller
- configured to provide signals to the transmission path for generation of signaling for transmission and
- configured to receive signals from the demodulator in each of the plurality of receive paths representative of received signaling for symbol recognition
- thereby enabling the multi-mode transceiver to communicate with a plurality of wireless networks simultaneously; and wherein each of the plurality of receive paths include a digital down converter element prior to said demodulator and configured to extract a particular channel frequency for receipt by the controller, the particular channel frequency associated with one or more of the plurality of wireless network standards.

16. The multi-mode transceiver arrangement of claim 15, wherein the plurality of wireless network standards comprise two or more of:
Zigbee, Thread, Bluetooth, Bluetooth LE, WiFi or one of a plurality of protocols based on IEEE standard 802.15.4.

17. An electronic device including the multi-mode transceiver arrangement of claim 15,
the electronic device comprising any one of a router or hub of a wireless sensor network.

18. A wireless sensor network comprising a plurality of nodes wherein at least one of said nodes includes the multi-mode transceiver arrangement of claim 15.

* * * * *